United States Patent
Moir et al.

(10) Patent No.: US 10,674,005 B2
(45) Date of Patent: *Jun. 2, 2020

(54) ANTI-DISTRACTED DRIVING SYSTEMS AND METHODS

(71) Applicant: 1943596 ALBERTA LTD., Calgary (CA)

(72) Inventors: David William Moir, Calgary (CA); Lanny Westgard, Saskatoon (CA); Phil Laplante, Sherwood Park (CA); Glen Suitor, North Vancouver (CA); Dean Lorenson, Calgary (CA); Brooke Alexandra Moir, Clagary (CA); Hamilton Allen Turner, Lake Frederick, VA (US); Ronald J. Waranowski, Finksburg, MD (US); Christopher Jules White, Nashville, TN (US)

(73) Assignee: 1943596 ALBERTA LTD., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,871

(22) Filed: Apr. 29, 2019

(65) Prior Publication Data

US 2019/0289126 A1 Sep. 19, 2019

Related U.S. Application Data

(63) Continuation-in-part of application No. 16/197,836, filed on Nov. 21, 2018, which is a continuation of
(Continued)

(51) Int. Cl.
*H04W 24/00* (2009.01)
*H04M 1/725* (2006.01)
(Continued)

(52) U.S. Cl.
CPC ...... *H04M 1/72577* (2013.01); *H04B 5/0031* (2013.01); *H04W 4/025* (2013.01);
(Continued)

(58) Field of Classification Search
CPC ......... H04W 64/00; H04W 4/02; H04W 4/12; H04W 4/14; H04W 88/02; H04W 88/06; H04W 88/184; H04W 76/02; H04W 92/02
(Continued)

(56) References Cited

U.S. PATENT DOCUMENTS

2013/0035117 A1 2/2013 Litkouhi et al.
2015/0168175 A1 6/2015 Abramson
(Continued)

FOREIGN PATENT DOCUMENTS

WO 2014/072935 A1 5/2014

OTHER PUBLICATIONS

USPTO, Office Action for U.S. Appl. No. 16/021,783 dated Sep. 7, 2018.
(Continued)

*Primary Examiner* — Temica M Beamer
(74) *Attorney, Agent, or Firm* — Norton Rose Fulbright Canada LLP

(57) ABSTRACT

Systems and methods for reducing distracted driving are disclosed herein. A mobile device may receive one or more beacon signals emitted from one or more beacons located at different locations within a vehicle. The mobile device determines whether the mobile device is located within the vehicle. The mobile device disables one or more functions of the mobile device if determined to be in the vehicle. The mobile device then determines whether to re-enable at least one of the disabled functions.

18 Claims, 15 Drawing Sheets

Related U.S. Application Data application No. 15/784,053, filed on Oct. 13, 2017, now Pat. No. 10,171,650, which is a continuation of application No. 15/097,139, filed on Apr. 12, 2016, now Pat. No. 9,819,789, application No. 16/396,871, which is a continuation-in-part of application No. 16/021,783, filed on Jun. 28, 2018, now Pat. No. 10,326,878, which is a continuation-in-part of application No. 15/784,053, which is a continuation of application No. 15/097,139.

(60) Provisional application No. 62/281,941, filed on Jan. 22, 2016.

(51) Int. Cl.
| | | |
|---|---|---|
| *H04W 4/02* | (2018.01) | |
| *H04W 4/14* | (2009.01) | |
| *H04B 5/00* | (2006.01) | |
| *H04W 4/80* | (2018.01) | |
| *H04W 24/08* | (2009.01) | |
| *H04M 1/60* | (2006.01) | |

(52) U.S. Cl.
CPC ............... *H04W 4/14* (2013.01); *H04W 4/80* (2018.02); *H04W 24/08* (2013.01); *H04M 1/6075* (2013.01)

(58) Field of Classification Search
USPC .......................... 455/456.1, 466, 565, 422.1
See application file for complete search history.

(56) References Cited

U.S. PATENT DOCUMENTS

| | | |
|---|---|---|
| 2016/0180677 A1 | 6/2016 | Reed |
| 2016/0227021 A1* | 8/2016 | Tadayon ................ H04W 4/50 |

OTHER PUBLICATIONS

USPTO, Office Action for U.S. Appl. No. 15/784,053 dated Jun. 13, 2018.
USPTO, Office Action for U.S. Appl. No. 16/197,836 dated Dec. 27, 2019.
USPTO, Office Action for U.S. Appl. No. 15/097,139 dated Nov. 14, 2016.
USPTO, Office Action for U.S. Appl. No. 15/097,139 dated Aug. 23, 2017.
USPTO, Office Action for U.S. Appl. No. 15/784,053 dated Nov. 14, 2017.
USPTO, Office Action for U.S. Appl. No. 15/784,053 dated Jun. 23, 2018.
CIPO, Office Action for CA Application No. 2,955,542 dated Sep. 28, 2018.

* cited by examiner

ANTI-DISTRACTED DRIVING SYSTEMS AND METHODS

CROSS-REFERENCE TO RELATED APPLICATIONS

This application is a continuation-in-part of U.S. patent application Ser. No. 16/197,836, filed on Nov. 21, 2018, which is a continuation of U.S. patent application Ser. No. 15/784,053, filed on Oct. 13, 2017 and issued as U.S. Pat. No. 10,171,650, which is a continuation of U.S. patent application Ser. No. 15/097,139, filed on Dec. 4, 2016 and issued as U.S. Pat. No. 9,819,789, which claims priority from U.S. Provisional Patent Application No. 62/281,941, filed Jan. 22, 2016. This application is also a continuation-in-part of U.S. patent application Ser. No. 16/021,783, filed Jun. 28, 2018, which is a continuation-in-part of U.S. patent application Ser. No. 15/784,053, filed on Oct. 13, 2017 and issued as U.S. Pat. No. 10,171,651, which is a continuation of U.S. patent application Ser. No. 15/097,139, filed on Dec. 4, 2016 and issued as U.S. Pat. No. 9,819,789, which claims priority from U.S. Provisional Patent Application No. 62/281,941, filed Jan. 22, 2016. The entire contents of each of the aforementioned applications are incorporated herein by reference.

FIELD

This relates generally controlling the operation of mobile devices and, in particular, to systems and methods for deactivating functions of mobile devices in vehicles.

BACKGROUND

Modern mobile telecommunications devices are capable of myriad functions. Smartphones and tablet computers can be used, for example, to browse the internet, play media, send and receive telephone calls, and send and receive messages including short message service (SMS), email and data messages.

Mobile devices are often used by operators of vehicles. Use of certain functions while driving, such as text communication or input, media playback, or the like, may be dangerous and may violate distracted driving legislation in some jurisdictions.

Accordingly, there is a need for systems and methods for controlling operation of mobile devices in vehicles.

SUMMARY

Disclosed herein is an anti-distracted driving system, comprising: a plurality of transceivers at different locations within a vehicle, each of the transceivers operable to receive a signal emitted from a mobile communication device in accordance with a wireless communication protocol and to output a detection signal indicative of the strength of the received signal; a controller in communication with the transceivers to receive the detection signals, the controller operable to calculate a corresponding distance of the mobile communication device for each of the detection signals and to determine a location of the mobile communication device within the vehicle based on the distances; the controller further operable to send a signal from a transceiver to a mobile communication device according to a wireless communication protocol in response to determining that the mobile communication device is less than a threshold distance from a driver's seat, the signal causing at least one function of the mobile communication device to be inhibited.

Also disclosed herein is a mobile communication device, comprising: a processor; a memory storing software applications; a wireless communication radio, the wireless communication radio operable under control of the processor to receive an interrogation signal and to emit a response signal, and to receive a disabling signal; wherein the software applications include an application operable to cause the processor, in response to receiving a disabling signal, to inhibit a function of the mobile communication device.

Also disclosed herein is an anti-distracted driving system, comprising: one or more beacons at different locations within a vehicle, each of said beacons including a transceiver operable to broadcast a beacon signal wirelessly; and a mobile device comprising a processor and a memory storing computer-executable instructions that, when executed by said processor, cause said mobile device to perform a method comprising: receive one or more beacon signals from said one or more beacons; determining, by said mobile device, that said mobile device is within said vehicle; responsive to determining that said mobile device is within said vehicle, disabling one or more functions of said mobile device; determine, by said mobile device, whether to re-enable at least one of said one or more functions of said mobile device; and responsive to determining that at least one of said one or more functions of said mobile device should be re-enabled, re-enabling at least one of said one or more functions of said mobile device.

Also disclosed herein is a method comprising: receiving, at a mobile device, one or more beacon signals from one or more beacons located at different locations within a vehicle; determining, by said mobile device, that said mobile device is within said vehicle; responsive to determining that said mobile device is within said vehicle, disabling one or more functions of said mobile device; determining, by said mobile device, whether to re-enable at least one of said one or more functions of said mobile device; and responsive to determining that at least one of said one or more functions of said mobile device should be re-enabled, re-enabling at least one of said one or more functions of said mobile device.

DESCRIPTION OF THE FIGURES

In the figures, which illustrate example embodiments.

DETAILED DESCRIPTION

Figure 1:
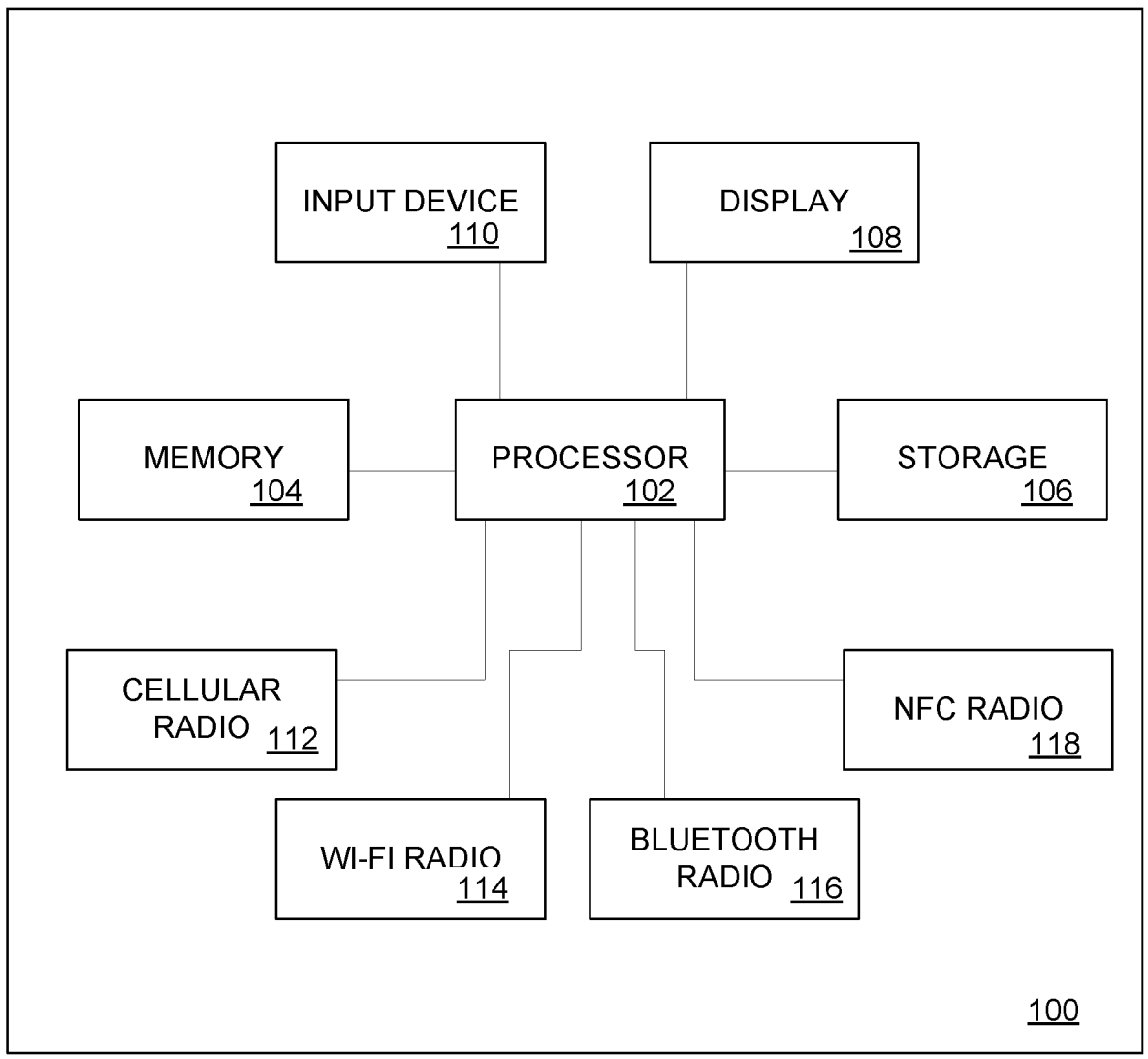
FIG. 1 is a schematic diagram of a mobile communication device.

FIG. 1 depicts a schematic diagram of an example mobile communication device 100. As depicted, mobile communication device 100 is a smartphone.

Mobile device 100 includes a processor 102. Processor 102 may be an Intel™ x86 processor, ARM™ processor or the like. Processor 102 is interconnected with a memory 104 and persistent storage 106. Processor 102 is further interconnected with one or more display devices 108 and one or more input devices 110, such as a touch-sensitive panel, keyboard or the like.

Processor 102 may further be interconnected with a plurality of communications radios. For example, mobile communication device 100 may have at least one cellular radio 112 for voice or data communications on a wireless network. Processor 102 may also be interconnected with a WI-FI radio 114, a bluetooth radio 116 and a near-field communication (NFC) radio 118.

Cellular radio 110 may be operable, for example, interface mobile communication device 100 to a 2G/3G/4G/LTE GSM or CDMA cellular network. WI-FI radio 114 may be operable to wirelessly interface mobile communication device 100 to a local-area network, for example, using IEEE 802.11a/b/g/n/ac standards. Bluetooth radio 116 may be operable to interface mobile communication device 100 with neighboring bluetooth devices according to a bluetooth protocol. NFC radio 118 may be operable to behave in any of a plurality of standard NFC protocols. NFC radio 118 may be capable of operating in a plurality of different modes, including NFC card emulation modes, NFC reader/writer modes and NFC peer-to-peer modes. One or more of cellular radio 110, wi-fi radio 114, bluetooth radio 116 and NFC radio 118 may be capable of receiving signals according to corresponding wireless communication protocols and reporting an associated signal strength.

In some embodiments, one or more components of mobile communication device 102 may be formed as portions of a single semiconductor die, referred to as a "system-on-chip". Alternatively, components may be formed as separate semiconductor dies, in communication through one or more buses on a circuit board.

Figure 2:
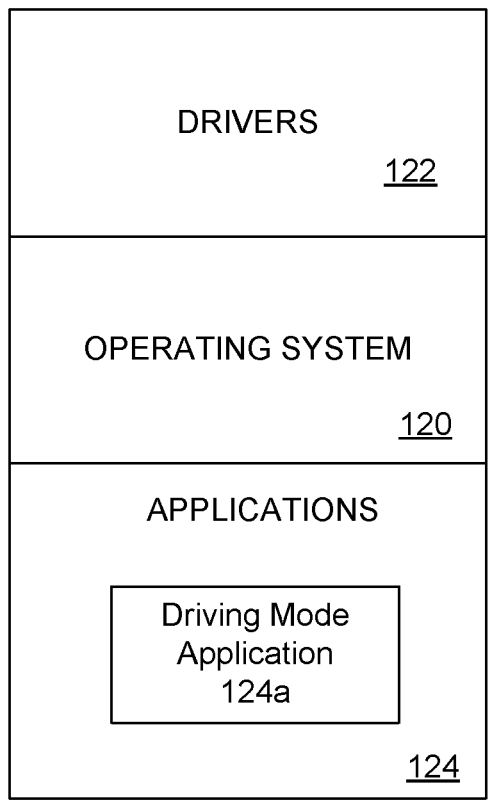
FIG. 2 is a block diagram showing software applications at the mobile communication device of FIG. 1.

Mobile device 100 may operate under control of software stored on storage 106 and executed by processor 102. FIG. 2 depicts example software components.

Software components may include an operating system 120, such as Apple™ iOS™, Android™, Microsoft™ Windows™, Linux or the like. Operating system 120 may interface with hardware components of mobile communication device 100 by way of drivers 122. A plurality of applications 124 may run within operating software 120.

Operating system 120 may provide applications 124 with access to low-level (e.g. hardware) functions of mobile communication device 100 by way of application programming interfaces (APIs).

By way of example, applications 124 may include a phone dialer, an email client, an internet browser, messaging applications, social media applications, media players, and the like. Applications 124 may further include one or more settings applications for controlling functions of mobile communication device 120. The settings applications may, for example, toggle components such as cellular radio 110, WI-Fi radio 112, Bluetooth radio 114 and NFC radio 116 ON or OFF. The settings applications may further enable or disable other applications from running, or enable or disable specific files or file types from being opened.

The settings applications may be operable in response to user input, for example, touching a button or screen, or to an event such as a received message, data transmission, signal or the like. Settings may therefore be altered in response to a transmission received on any of cellular radio 112, WI-Fi radio 114, bluetooth radio 116 or NFC radio 118.

In an embodiment, applications 124 may include a driving mode application 124a. Driving mode application 124a may be operable to receive signals from a radio such as NFC radio 118 bluetooth, radio 116, Wi-Fi radio 114 or cellular radio 112. Driving mode application 124a may also be operable to access and change settings of other applications 124 or of operating system 120. For example, as described in further detail hereinafter, driving mode application 124a may be operable to receive a signal from NFC radio 118 or bluetooth radio 116 indicating that a driving mode should be invoked. In response to the received signal, driving mode application 124a may disable functions of mobile communication device 100 or of applications 124 on mobile communication device 100.

When a driving mode is active, driving mode application 124a may, for example, partially or fully disable one or more radios of mobile communication device 100. For example, driving mode application 124a may place cellular radio 112 in a mode that inhibits sending or receiving of data or text transmissions, and may inhibit sending or receiving of cellular calls unless such calls are routed through a hands-free device such as a bluetooth headset. Alternatively or additionally, driving mode application 124a may disable cellular radio 112 entirely.

Alternatively or additionally, driving mode application 124a may inhibit launching of specific applications, such as web browsers, media players, social media applications, email, and messaging applications.

Alternatively or additionally, driving mode application 124a may disable certain input modes of mobile communication device 100. For example, driving mode application 124a may disable keyboard or touchscreen input, or may disable one or more buttons on mobile communication device 100.

Optionally, driving mode application 124a may convert disabled functions into non-distracting alternative forms. For example, driving mode application 124a may read text-based messages such as short message service (SMS) or email messages using a text-to-voice engine. Alternatively or additionally, driving mode application 124a may receive voice inputs and may process such inputs using a voice-to-text engine.

In some embodiments, driving mode application 124a or functions thereof may be incorporated into operating system 120 of mobile device 100. In other embodiments, driving mode application may be given elevated permissions on installation or at runtime, such as read/write/execute access to a root directory of persistent storage 106.

Figure 3:
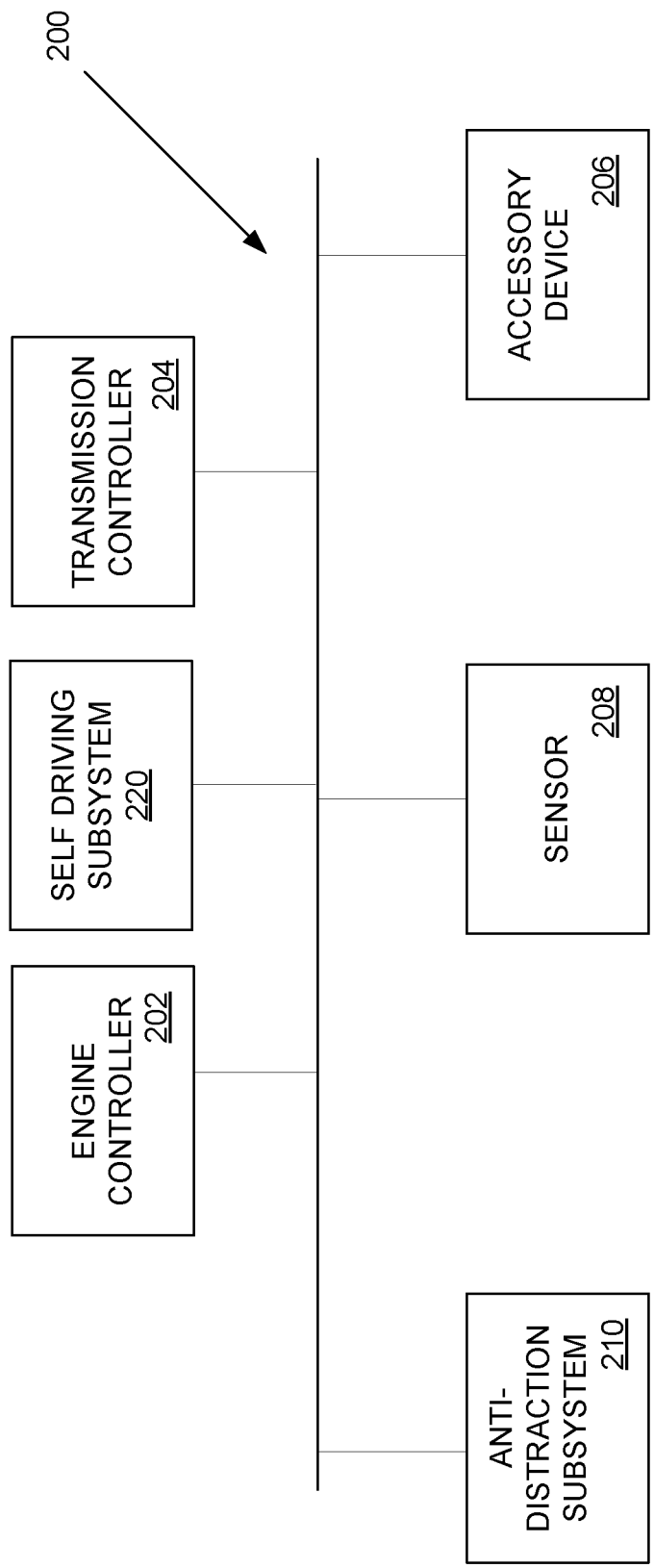
FIG. 3 is a schematic diagram of components of a vehicle computer system.

FIG. 3 depicts a simplified schematic view of a vehicle computer system 200. Vehicle computer system 200 may include an engine controller 202, a transmission controller 204, one or more accessory devices 206, one or more sensors 208, a self driving subsystem 220, and an anti-distraction subsystem 210. Components of vehicle computer system 200 may be in communication over a network such as a controller area network (CAN) bus.

Engine controller 202 may be operable to control, measure and report engine conditions to other components of vehicle computer 200. For example, engine controller 200 may notify other components of engine RPM, throttle position, load, and the like.

Transmission controller 204 may be operable to control, measure and report transmission conditions to other components of vehicle computer 200. For example, transmission controller 204 may notify other components of vehicle computer 200 of gear selected, transmission speed, temperature and load, and the like.

Accessory devices 206 may be, for example, radios, navigation systems, climate control systems and the like.

Sensors 204 may include vehicle condition sensors such as air or fuel flow meters, speed sensors, tire pressure sensors, temperature sensors and the like.

Self driving subsystem 220 may include a plurality of sensors, radars, rangefinders, and lasers which are operable to collect data which can be processed by a processor through operation of software to create and/or maintain a mapping of the surroundings of the vehicles. Self driving subsystem 220 may determine a path for the vehicle to travel and interact with engine controller 202 and transmission controller 204 to control the vehicles acceleration, braking, and steering. Self driving subsystem 220 may provide fully autonomous or partially autonomous operation. That is, in some embodiments, human intervention may be required for certain functions. For example, self-driving subsystem 220 may provide adaptive cruise control (which adjusts the speed of the vehicle so as to obviate the need for braking while cruise control is enabled) while still requiring the driver to steer the car. In other embodiments, self driving subsystem 220 may control steering, acceleration and braking. As described herein, references to "self driving mode" refer to autonomous operation of the vehicle with respect to at least one of steering, acceleration and braking.

As described in further detail below, anti-distraction subsystem 210 may be configured to receive signals from one or more of engine controller 202, transmission controller 204, accessories 206 and sensors 208 and, based on the received signals, send a signal to a mobile device to cause deactivation of features.

Figure 4:
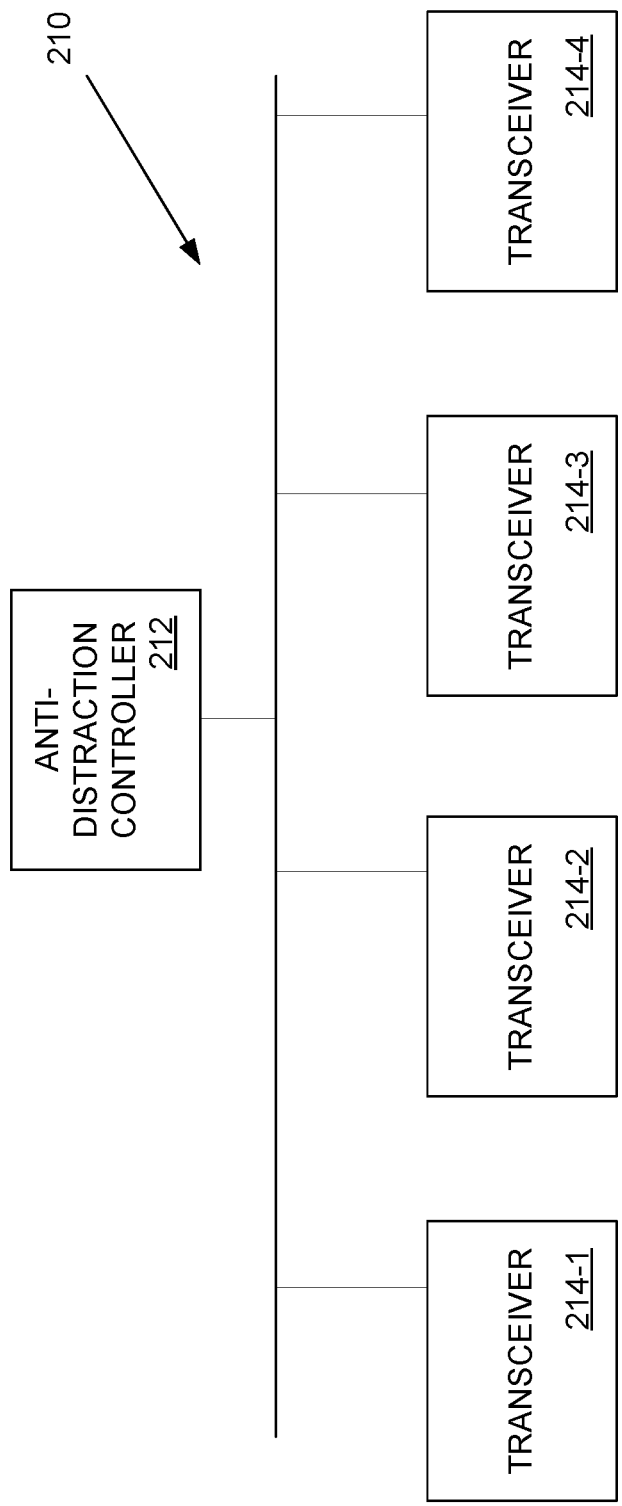
FIG. 4 is a schematic diagram of an anti-distracted driving subsystem of the computer system of FIG. 3.

FIG. 4 depicts components of anti-distraction subsystem 210. Anti-distraction subsystem 210 includes an anti-distraction controller 212 in communication with a plurality of transceivers 214. As depicted, anti-distraction subsystem includes four transceivers 214-1, 214-2, 214-3, 214-4. Other embodiments may have different numbers of transceivers.

Each of transceivers 214 may be operable to send and receive signals according to a wireless communication protocol, such as a cellular, wi-fi, bluetooth or NFC protocol. Transceivers may be configured to send interrogation signals to nearby devices, which may reply with response signals. Transceivers 214 may be configured to report the signal strength of the received response signal. As will be apparent, the strength of the received signal may be dependent on the distance of the receiving device from the transceiver 214.

Transceivers 214 may be configured to report received signal strength to anti-distraction controller 212. In some embodiments, transceivers 214 may be able to send and receive signals through a range of at least 3-4 feet. In some embodiments, the range of transceivers 214 may be much greater.

In an example, transceivers 214 may be NFC transceivers. NFC transceivers may read signals from nearby NFC devices by sending an interrogation signal. In response, any nearby NFC devices will send a response signal, the form of which may depend on the mode of the responding device. For example, passive NFC devices such as NFC tags or cards may be excited by the interrogation signal and emit a response signal. Active NFC devices may receive the interrogation signal and actively transmit a response signal.

In other embodiments, transceivers 214 may be wi-fi, bluetooth cellular, or other appropriate wireless transceivers and may send and receive signals according to an appropriate wireless protocol for communication with mobile devices using a corresponding mobile device radio.

Figure 5A:
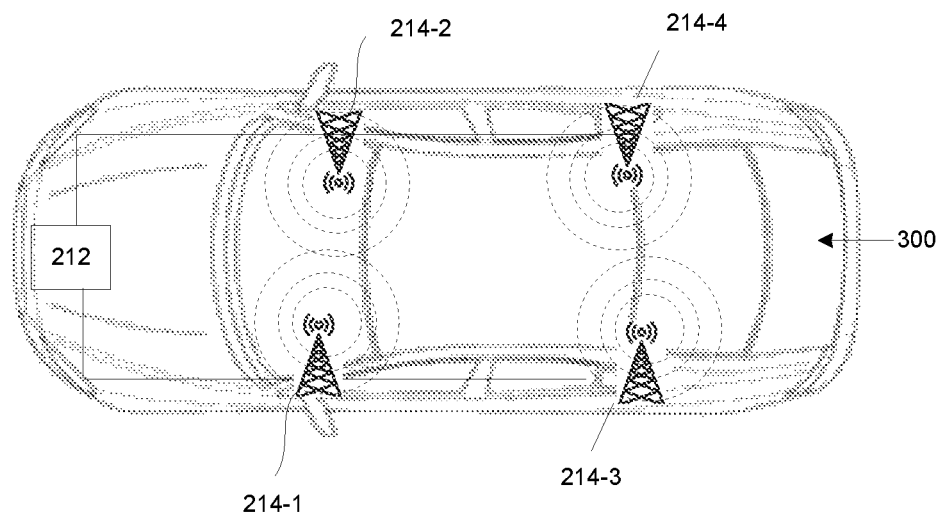
FIGS. 5a-5b are top and side elevation views, respectively, of a vehicle showing components of the anti-distracted driving subsystem of FIG. 4.
Figure 5B:
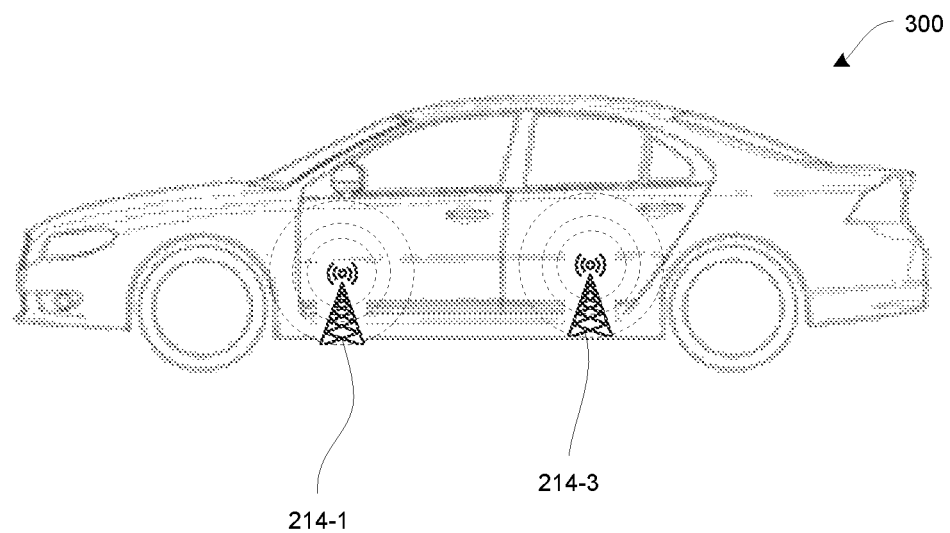

FIGS. 5A-5B depict top and side views, respectively, of a vehicle 300 with anti-distraction subsystem 210. Transceivers 214-1, 214-2, 214-3, 214-4 (individually and collectively, transceivers 214) are located at differing locations around the passenger cabin. As depicted, transceiver 214-1 is located in the front driver's side of the cabin; transceiver 214-2 is located in the front passenger side; transceiver 214-3 is located in the rear driver's side and transceiver 214-4 is located in the rear passenger side. In some embodiments, transceivers 214 may be mounted inside respective structural pillars of the vehicle cabin. Transceivers 214 may be mounted, for example, between panels of vehicle 300 and upholstery (e.g. the headliner) of vehicle 300. Transceivers 214 are mounted so that metallic members of vehicle 300 do not interfere with sending and receiving signals.

Transceivers 214 may detect a mobile device 100 in vehicle 300 by sending interrogation signals and receiving response signals. Each of transceivers 214 may provide a signal to anti-distraction controller 212 indicative of the strength of the received signal.

Anti-distraction controller 212 is configured to triangulate the approximate location of mobile device 100 based on the signals received from the transceivers 214.

Figure 7:
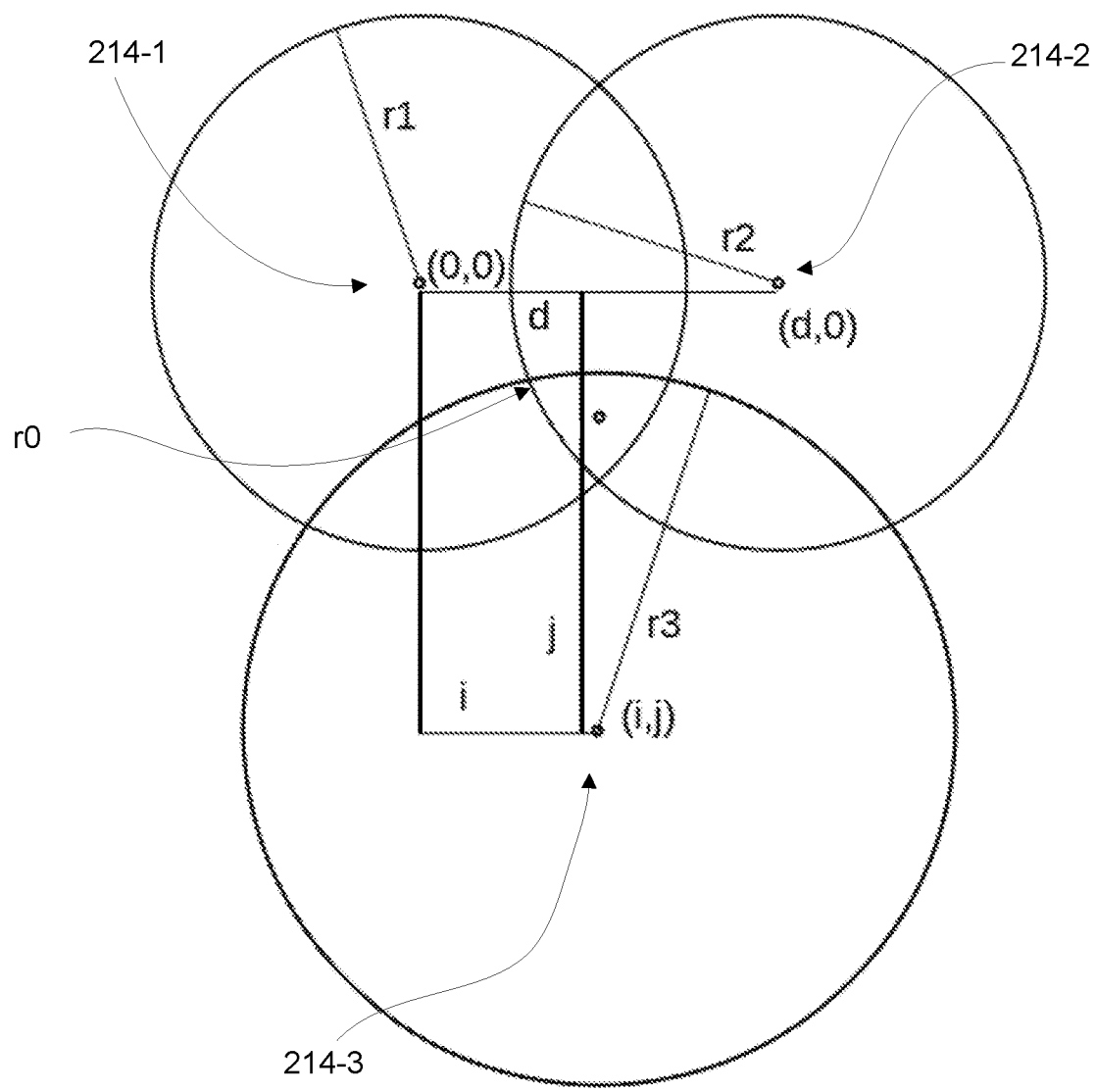
FIG. 7 is a schematic diagram of the anti-distracted driving subsystem of FIG. 4 determining a location of a mobile communication device.

FIG. 7 depicts 3 transceivers 214 locating a mobile device 100. As noted above, each of transceivers 214 sends an interrogation signal. The interrogation signals cause a wireless radio of mobile device 100, e.g. NFC radio 118, to emit a response signal. Optionally, transceivers 214 and mobile device 100 may be configured so that each device sends a unique interrogation signal which causes mobile device 100 to likewise emit a unique response signal. The response signal may be emitted at a standard strength and received by each transmitted at a lower strength. The strength of the response signal at a given transceiver 214 is proportional to the distance between the transceiver 214 and the mobile device 100.

As shown in FIG. 7, each signal strength is associated with a corresponding distance $r_1$, $r_2$, $r_3$ from the respective transceiver 214. Accordingly, based on the received signals, it can be determined that mobile device is located at a distance $r_1$ from transceiver 214-1; and at a distance $r_2$ from transceiver 214-2; and at a distance $r_3$ from transceiver 214-3. Thus, each received signal is associated with a spherical region of possible locations of mobile device 100.

Each of transceivers 214 sends a signal to controller 212 indicative of the respective received signal strength (and thus, of the respective radius $r_1$, $r_2$, $r_3$). Controller 212 may be programmed with locations of transceivers 214 within vehicle 300.

Controller 212 determines a region $r_0$ corresponding to the mutual interaction of a sphere of radius $r_1$ centered on transceiver 214-1; a sphere of radius $r_2$ centered on transceiver 214-2; and a sphere of radius $r_3$ centered on transceiver 214-3. Mobile device 100 may be known to be located within region $r_0$. Since controller 212 is programmed with the locations of transceivers 214 within vehicle 300, region $r_0$ may be translated to a location within the vehicle, namely, a location relative to the driver's seat.

Though FIG. 7 depicts three transceivers 214, more transceivers 214 may be used, and a larger number of transceivers 214 may allow region $r_0$ to be determined more accurately.

Figure 8:
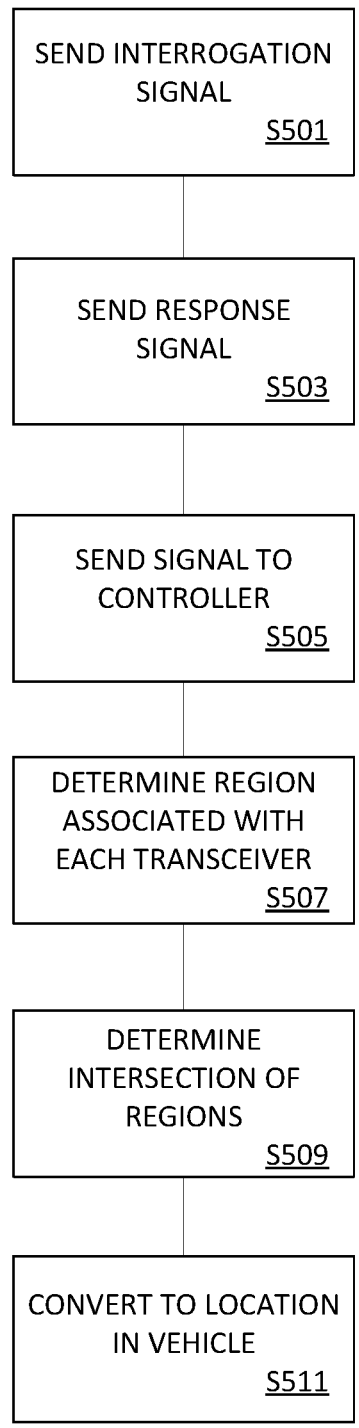
FIG. 8 is a flow chart showing a method of locating a mobile communication device.

FIG. 8 depicts a method of determining the location of device 100 by transceivers 214 and controller 212. At block S501, each transceiver 214 emits an interrogation signal. At block S503, mobile device 100 emits a response signal. At block S505, each transceiver sends a signal to controller 212 indicative of the strength of the received response signal and thus, the distance between mobile device 100 and the respective transceiver 214. At block S507, controller 212 determines a region associated with each response signal strength. At block S509, controller 212 determines a region of intersection of the regions. At block S511, controller 212 translates the region of intersection to a location within the vehicle 300.

Anti-distraction controller 212 further receives signals from one or more of engine controller 202, transmission controller 204, accessories 206 and sensors 208 indicative of the state of vehicle 300, namely, whether vehicle 300 is in motion.

If a mobile device 100 is located within vehicle 300 at a location proximate the driver's seat while vehicle 300 is in motion, anti-distraction controller 212 is configured to send a signal to the mobile device 100 causing functions of the mobile device to be disabled.

Figure 6:
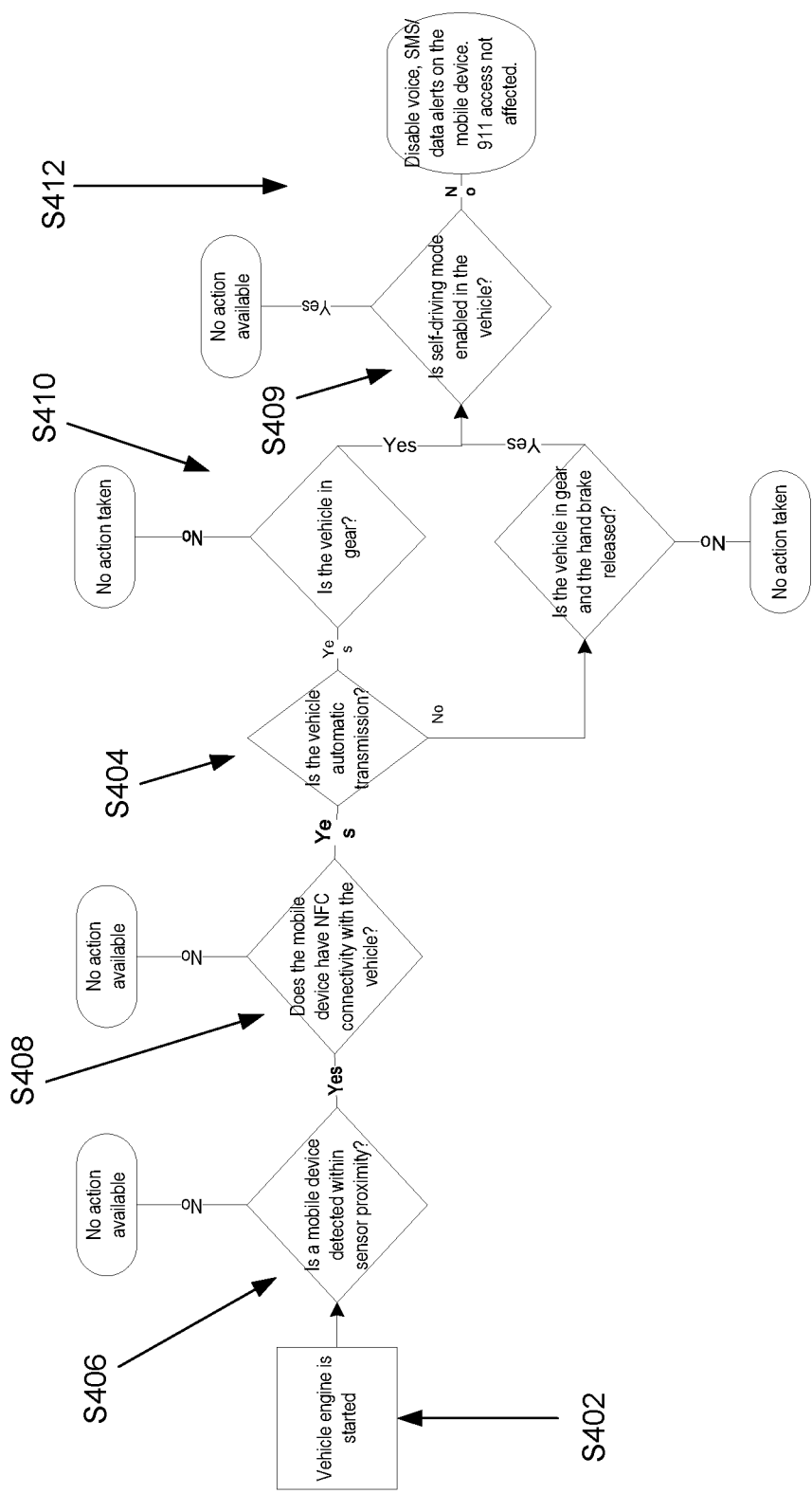
FIG. 6 is a flow diagram depicting a control process of the anti-distracted driving subsystem of FIG. 4.

FIG. 6 depicts a flow chart of a process S400 of operation of anti-distraction subsystem 210. While anti-distraction subsystem 210 is active, transceivers 214 periodically send interrogation signals to determine the presence of mobile device 100.

At block S402, the engine of vehicle 300 is started, activating anti-distraction subsystem 210.

At block S406, anti-distraction controller 212 determines, based on signals received from transceivers 214, whether a mobile device 100 is present and the approximate location of the mobile device within vehicle 300.

If mobile device 100 is determined to be within a specific threshold proximity to the drivers seat at block S408, anti-distraction controller 212 determines, based on signals received from transceivers 214, whether transceivers 214 have connectivity with mobile device 100. The threshold may correspond approximately to the reach of a driver seated in the driver's seat. This may prevent a driver from defeating the system by simply holding a mobile device 100 outside the proximity threshold. In an example, the proximity threshold may be about 50 cm.

At block S404, anti-distraction controller 212 determines if the transmission of vehicle 300 is automatic or manual based on a signal from transmission controller 204.

At block S410, if anti-distraction subsystem 210 has connectivity with mobile device 100, anti-distraction controller 212 determines, based on a signal from transmission controller 204, whether vehicle 300 is in gear. Anti-distraction controller 212 may also determine, for example, if the transmission is manual, based on a signal from an appropriate sensor 208, the speed of vehicle 300 or whether a parking or auxiliary brake of vehicle 300 is fully engaged.

At block S409, the anti-distraction controller 212 determines, based on signals received from self driving subsystem 220, whether the vehicle is in a self-driving mode. In some embodiments, if self-driving mode is enabled, anti-distraction subsystem 200 may take no action. This may be desirable when self-driving mode for the vehicle does not require the user to perform any of steering, braking or accelerating for a period of time or throughout operation of the vehicle. If self-driving mode is not enabled in the vehicle, then the method proceeds to block S412.

At block S412, if mobile device 100 is in proximity to the drivers seat, anti-distraction subsystem 200 has connectivity with mobile device 100, vehicle 300 is in gear, without the parking brake engaged, or travelling above a speed threshold, e.g. 10 km/h, and self-driving mode is not enabled in the vehicle, anti-distraction subsystem 210 may send a signal to mobile device 100 causing mobile device 100 to enter a driving mode.

In the driving mode, mobile device 100 may partially or fully disable one or more of its radios. For example, cellular radio 112 may be placed into a mode in which sending and receiving of data or text transmissions is inhibited. Alternatively, cellular radio 112 may be fully disabled.

In addition, in the driving mode, mobile device 100 may inhibit launching of specific applications such as web browsers, media players, social media applications, email and messaging applications.

Figure 9A:
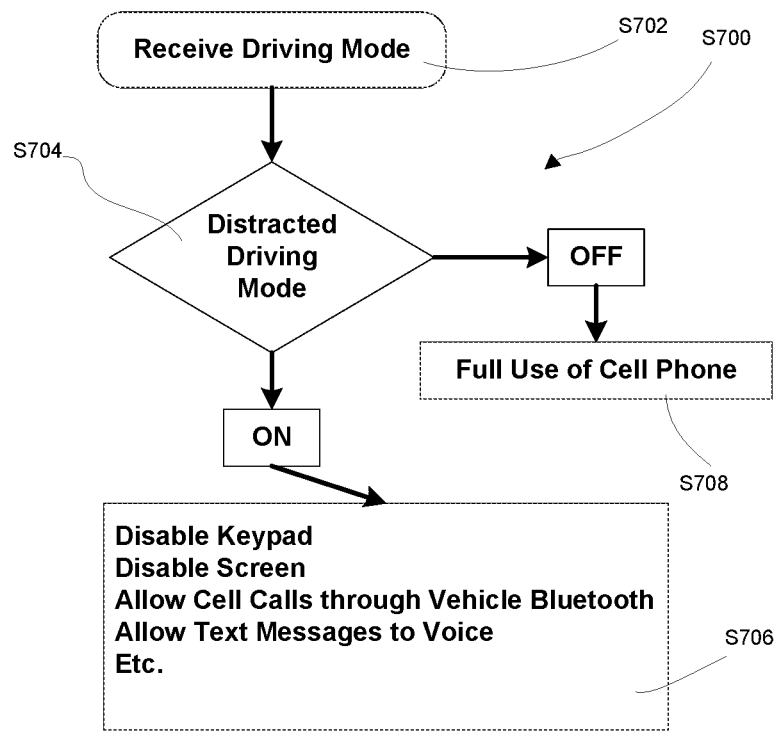
FIGS. 9A-9B are flow charts showing methods performed at a mobile communication device.
Figure 9B:
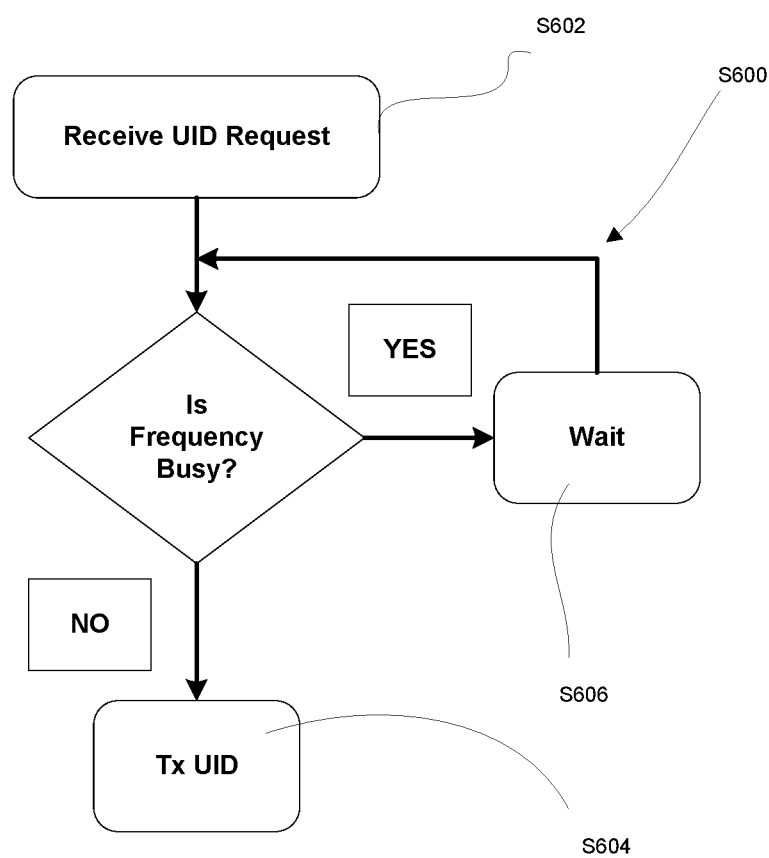

FIGS. 9A-9B depict example processes S600, S700 carried out at mobile devices 100. The processes S600, S700 may be carried out, for example, by processors and radios of mobile devices 100 under control of software stored on and executed by the mobile devices 100.

Referring to FIG. 9A, at block S602, a mobile device 100 may receive a request for a unique identifier (UID) of the mobile device. Such request may, for example, be received from a transceiver 214. The request may be transmitted and received by wireless transmission at a particular frequency. In response to receipt of the UID request, the mobile device 100 may send a response including a UID of the mobile device 100. The response may be sent using a radio of the mobile device 100. In an example, the response may be sent by the same method as the UID request (e.g. NFC, bluetooth, etc.). If the relevant radio and transmission frequency of the mobile device 100 is not busy, the mobile device 100 transmits the response at block S604. Alternatively, if the radio or transmission frequency is busy, the mobile device waits, at block S606, until the radio and frequency are free.

The process S600 may run in a loop at mobile device 100. Alternatively, process S600 may be performed using a service, application or the like at mobile device 100. Mobile device 100 may be configured to invoke the service, application or the like upon receipt of a UID request.

Referring to FIG. 9B, at block S702, mobile device 100 receives a message indicative of a selected mode. The mode message may be sent by a transceiver 214, for example, by NFC, bluetooth or the like, and received by mobile device 100 over a corresponding radio.

At block S704, mobile device 100 parses the received driving mode message and determines the selected mode. For example, the message may indicate a restricted or anti-distraction mode, or a full use mode. The former may be sent to a driver's mobile device 100 during driving.

If the driving mode message indicates the anti-distraction mode, process S700 moves to block S706, at which functions, applications, features or the like are disabled at mobile device 100. For example, keypad or text input may be disabled; a screen may be disabled, calls may be disabled unless sent or received by way of a connected hands-free device such as a headset. Alternatively or additionally, certain applications may be prevented from opening.

If the mode message indicates the full use mode, process S700 moves to block S708, at which mobile device 100 is permitted to operate without restriction.

The process S700 may run in a loop at mobile device 100. Alternatively, process S700 may be performed using a service, application or the like at mobile device 100. Mobile device 100 may be configured to invoke the service, application or the like upon receipt of a UID request.

Figure 10:
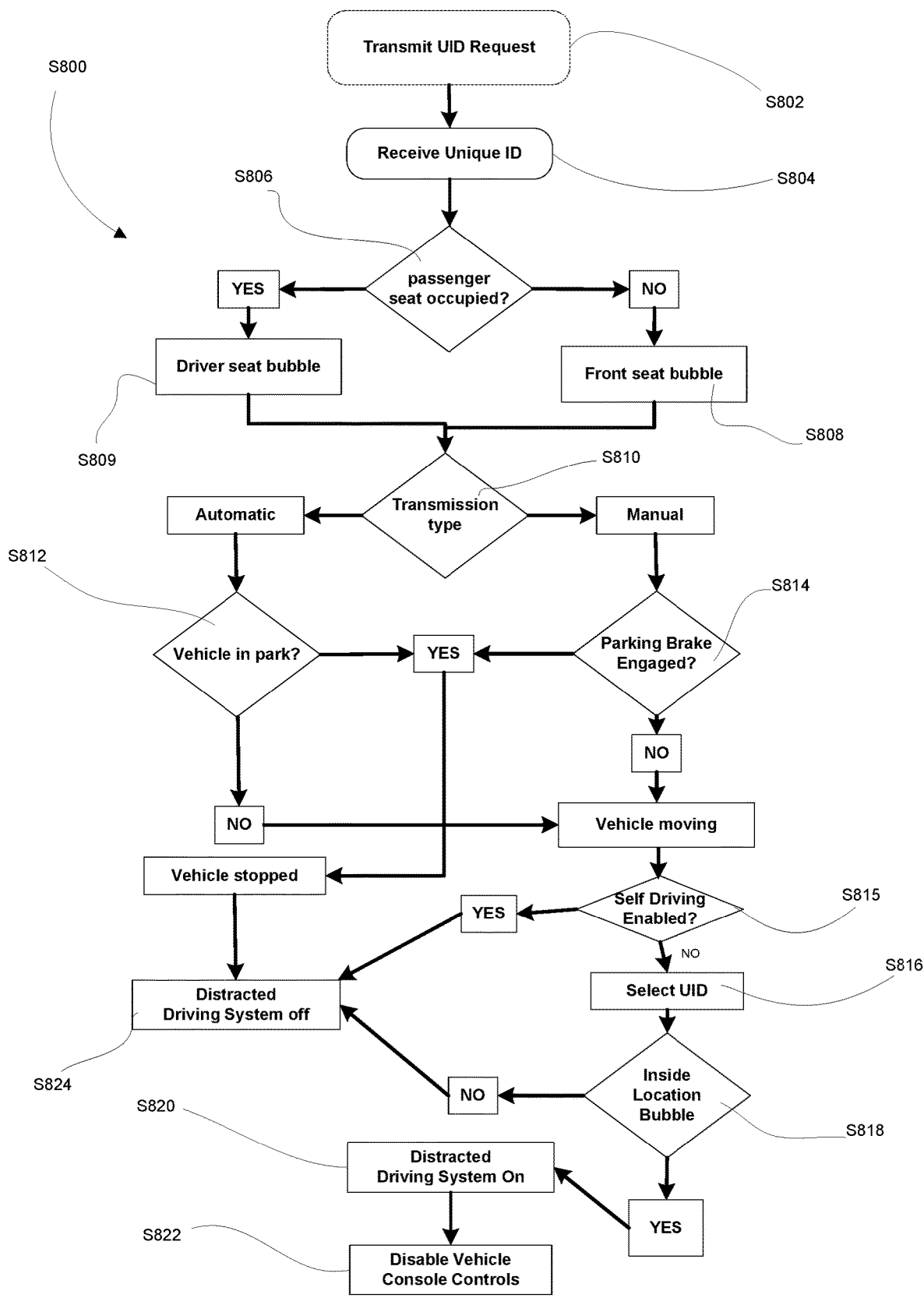
FIG. 10 is a flow chart showing a method performed by an anti-distracted driving subsystem.

Referring to FIG. 10, an example process S800 carried out by anti-distraction subsystem 210 is depicted.

At block S802, a UID request is transmitted to a mobile device 100 using a transceiver 214. The UID request may be sent, for example, using NFC, bluetooth, or the like, and may include instructions for causing the mobile device 100 to respond with a message including a UID. The request may be sent to a specific mobile device 100, causing a response from that mobile device 100, or it may be broadcast to all mobile devices 100 in range, causing each mobile device 100 to respond. In some embodiments, multiple UID requests may be transmitted, directed to multiple mobile devices 100. In some embodiments, transmission of UID requests may be periodically repeated.

At block S804, a message is received at a transceiver 214 including a UID of a mobile device 100. Anti-distraction subsystem 210 may store the received UID. Multiple UIDs may be received and stored contemporaneously, for example, if a UID request was broadcast at block S802 and multiple mobile devices 100 are present.

At block S806, anti-distraction subsystem 210 determines if a passenger is present in the vehicle's front passenger seat. Anti-distraction subsystem 210 may, for example, read a signal from a passenger airbag sensor indicative of at least a threshold weight being detected on the passenger seat.

If no passenger is present in the passenger seat, anti-distraction subsystem 210 may, at block S808, define a region of interest (hereinafter referred to as a "bubble") corresponding approximately to the front (driver's) row of seating in the vehicle. Any mobile device 100 located within the bubble may be placed in an anti-distraction mode while the vehicle is in motion.

If a passenger is present in the passenger seat, anti-distraction subsystem 210 may, at block S809, define a bubble corresponding approximately to the driver's seat of the vehicle. This may avoid a mobile device 100 of a passenger being placed in anti-distraction mode.

At block S810, anti-distraction subsystem 210 may determine a transmission type of the vehicle. As will be apparent, vehicles equipped with automatic transmissions typically have a "park" setting. In contrast, vehicles with manual transmissions typically do not have such a transmission setting. However, vehicles with manual transmissions may be immobilized by activation of a parking brake.

Thus, if the vehicle has an automatic transmission, at block S812, anti-distraction subsystem determines if the vehicle is in "park". This may be determined based on a signal from transmission controller 204. Conversely, if the vehicle has a manual transmission, at block S814, anti-distraction controller 210 may determine if the vehicle's parking brake is engaged. This may be determined, for example, based on a signal from a sensor on the parking brake or on the parking brake actuator (e.g. hand lever or foot pedal).

If the vehicle is in park or has its parking brake activated, anti-distraction subsystem 210 may determine that the vehicle is not in motion. Accordingly, at block S824 anti distraction subsystem 210 permits any mobile devices 100 to operate normally.

On the other hand, if the vehicle is not in park and the parking brake not engaged, anti-distraction subsystem 210 determines that the vehicle is in motion, in which case it may be desired to place one or more mobile devices 100 in anti-distraction mode.

At block S815, anti-distraction subsystem determines whether self-driving mode is enabled. This determination may be made, for example, based on signals received from self driving subsystem 220. Self driving subsystem 220 may include an a user interface (e.g. a touch screen or a button on a control panel in the vehicle) which may allow the operator of the vehicle to select and enable a self-driving mode. As depicted, if self-driving mode is enabled, then the anti-distraction subsystem 210 permits any mobile devices to operate normally. If self-driving mode is not enabled, the method proceeds to block S816.

At block S816, anti-distraction subsystem selects a UID received at block S804. At block S818, anti-distraction subsystem determines the location of the mobile device in accordance with the process described above and depicted in FIG. 8.

If the location of the mobile device 100 is outside the bubble identified at block S808 or S809, at block S824, anti distraction subsystem 210 permits any mobile devices 100 to operate normally.

If the location of the mobile device 100 is within the bubble associated with S808 and S809, at block S820, anti-distraction subsystem 210 sends a message to the mobile device 100 causing the device to enter a driving mode. The message may be sent by a transceiver 214, for example, using NFC, bluetooth or the like. As described above, the message may cause features or applications of mobile device to be disabled.

At block S822, anti-distraction subsystem may also cause features of the vehicle console or dashboard to be inhibited. For example, navigation systems may be disabled to prevent entry of text by a driver.

If anti-distraction subsystem 210 received any additional UIDs at block S804, the process loops through all of the received UIDs. That is, for each UID, the process returns to block 204 and proceeds through the remainder of process S800 and activates a driving mode for any UIDs located within the bubble. In some embodiments, more than one mobile device 100 may be located within the bubble and therefore, more than one device may be placed in driving mode.

Figure 11:
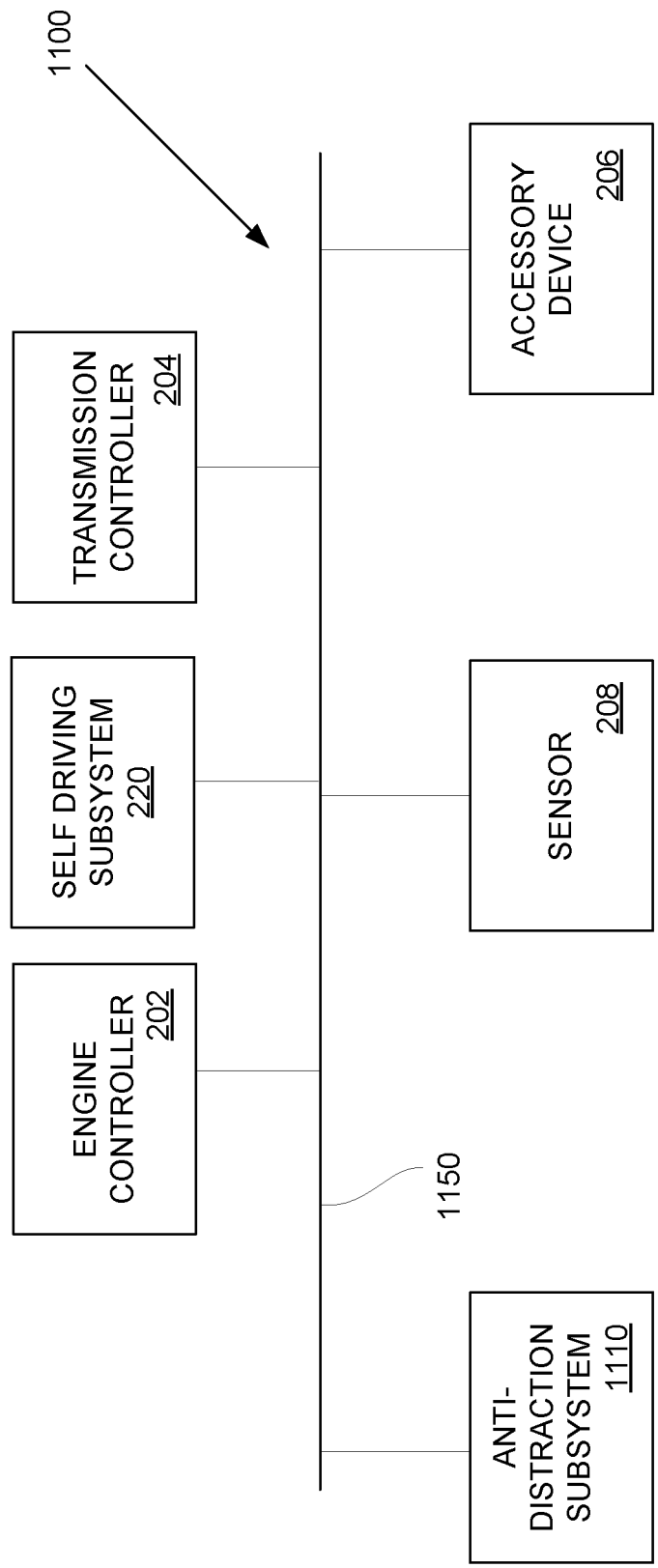
FIG. 11 is a schematic diagram of components of a vehicle computer system according to an example embodiment.

FIG. 11 is a schematic diagram of components of a vehicle computer system according to an example embodiment. As shown, vehicle computer system 1100 shares several components in common with vehicle computer system 200, including, but not limited to, engine controller 202, transmission controller 204, accessory device 206, sensor 208, self-driving subsystem 220, and anti-distraction subsystem 1110. Components of vehicle computer system 1100 may be in communication over a network 1150 such as a controller area network (CAN) bus.

As described in further detail below, anti-distraction subsystem 1110 may be configured to receive signals from one or more of engine controller 202, transmission controller 204, accessories 206, sensors 208, and self-driving subsystem 220 and, based on the received signals, broadcast a signal to a mobile device to cause deactivation of features. In some embodiments, anti-distraction subsystem may send a signal to one or more of engine controller 202, transmission controller 204, accessories 206 and sensors 208 to enable or disable particular vehicle functionality based on received signals via, for example, CAN bus 1150.

Figure 12:
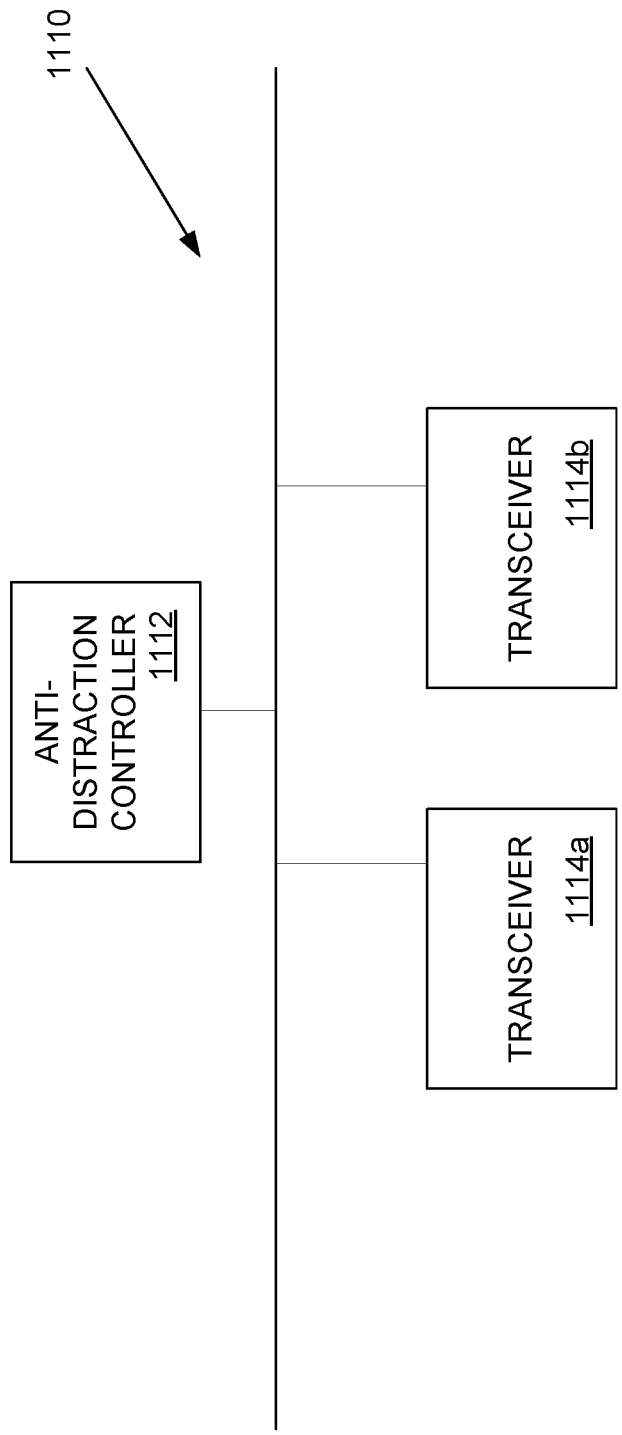
FIG. 12 is a schematic diagram of an anti-distracted driving subsystem of the computer system of FIG. 11.

FIG. 12 depicts components of an example anti-distraction subsystem 1110. Anti-distraction subsystem 1110 includes an anti-distraction controller 1112 which may be in communication with a plurality of transceivers 1114. As depicted, anti-distraction subsystem 1110 includes two transceivers 1114a, 1114b. In some embodiments, there may be fewer than two transceivers 1114. In some embodiments, there may be more than two transceivers 1114. In some embodiments, anti-distraction controller 1112 may include a transceiver separate from transceivers 1114a, 1114b. In some embodiments, anti-distraction controller 1112 might not be in communication with the transceivers 1114.

In some embodiments, anti-distraction controller 1112 is connected to the OBD port of vehicle 300. In some embodiments, beacon 1114a may be located in a storage compartment on a passenger side door of vehicle 300 or under the passenger seat of vehicle 300. Beacon 1114a may be fixed under the passenger seat using, for example, adhesive or a mechanical arrangement. In some embodiments, beacon 1114b may be located behind the center of a rear passenger seat or underneath the rear passenger seat of vehicle 300. One or more of the controller 1112, beacon 1114a and/or beacon 1114b may be installed, for example, by the vehicle manufacturer, a fleet service technician, an end consumer, or the like. In some embodiments, One or more of controller 1112, beacon 1114a and/or beacon 1114b may be embedded within panels or seats of vehicle 300.

Each of transceivers 1114 may be operable to send and/or receive signals according to a wireless communication protocol, such as a cellular, wi-fi, Bluetooth, or NFC protocol. Transceivers 1114 may be configured to send signals to nearby devices. In some embodiments, transceivers 1114 are Bluetooth beacons which are configured to broadcast status signals. In some embodiments, transceivers broadcast a status signal every 100 milliseconds. Bluetooth radio 116 of mobile device 100 may be configured to receive status signals from one or more transceivers 1114 (referred to herein as beacons 1114).

In some embodiments, applications executing in memory of mobile device 100 include driving mode application 124a. Driving mode application 124a may be operable to receive a signal from one or more beacons 1114, and determine the signal strength of the beacon signal (e.g. in Watts or decibels). In some embodiments, mobile device 100 is configured to estimate a distance between beacon 1114 and mobile device 100 based on signal characteristics, such as the signal strength of the received beacon signal. Distance may be estimated, for example, by driving mode application 124a being aware of the initial transmit power of beacon signals, and the knowledge that signal strength of electromagnetic signals attenuates over a distance. In some embodiments, distance may be estimated by recording observed signal characteristics at known distances, and developing a model linking observed signal characteristics to distances (e.g. using machine learning). In some embodiments, the distance may be estimated using a combination of approaches for more accurate estimates. In some embodiments, beacon 1114a may encode the status signal with an identifier to distinguish a status signal from beacon 1114a from a status signal from beacon 1114b. In so doing, driving mode application 124a on mobile device 100 can calculate an estimated distance from beacon 1114a and an estimated distance from beacon 1114b. In some embodiments, the locations of beacons 1114a, 1114b within a vehicle are known to mobile device 100, and thus a location of mobile device 100 within the vehicle can be determined based on the distance from beacon 1114a and the distance from beacon 1114b.

Figure 13A:
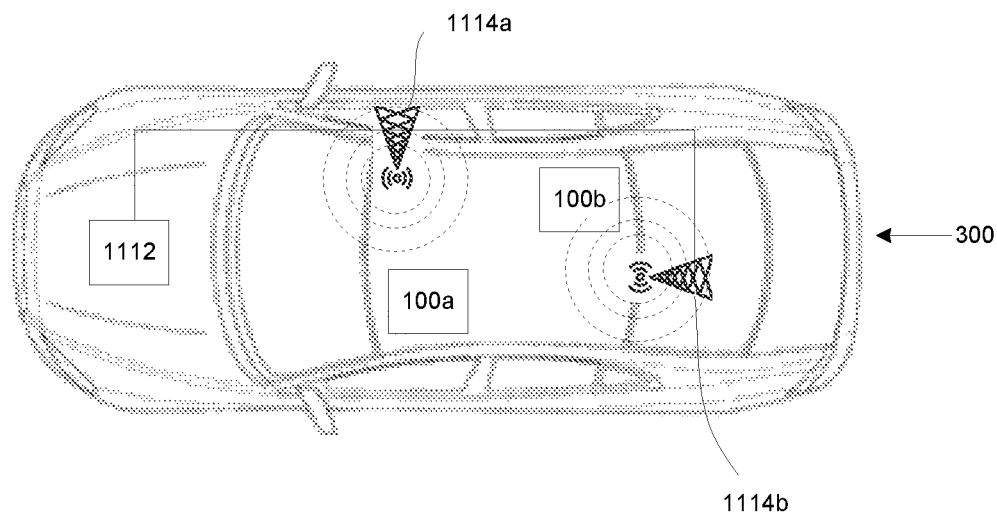
FIGS. 13A and 13B are top and side elevation views, respectively, of a vehicle showing components of the anti-distracted driving subsystem of FIG. 12.
Figure 13B:
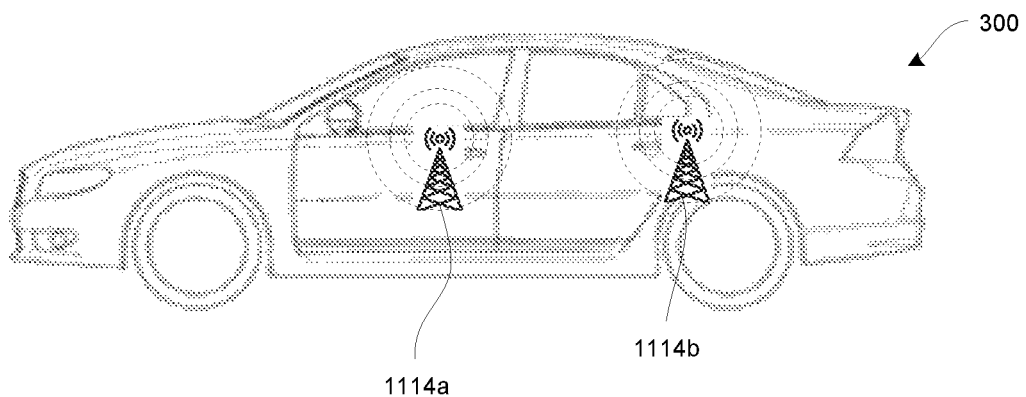

FIGS. 13A and 13B depict top and side views, respectively, of a vehicle 300 having anti-distraction subsystem 1110 incorporated therein. As depicted, signals may be emitted from transceivers 1114a, 1114b in a spherical direction of propagation (indicated by stippled rings in FIGS. 13A and 13B). Mobile device 100b may be sufficiently proximal to the transceivers 1114a, 1114b to be fully non-restricted, whereas mobile device 100a may be too far from transceivers 1114a, 1114b to be fully non-restricted. Transceivers 1114a, 1114b (individually and collectively, transceivers 1114) are located at differing locations around the passenger cabin of vehicle 300. As depicted, transceiver 1114a is located inside the passenger door of vehicle 300, and transceiver 1114b is located behind the rear seat of vehicle 300. In other embodiments, transceivers 1114a, 1114b may be placed in different locations within vehicle 300. In some embodiments, transceivers 1114 may be mounted inside respective structural pillars of the vehicle cabin. For example, transceivers 1114 may be mounted between panels of vehicle 300 and upholstery (e.g. the headliner) of vehicle 300. In such example embodiments, transceivers 1114 are mounted such that metallic members of vehicle 300 do not interfere with sending and/or receiving signals. It should be noted that FIGS. 13A and 13B illustrate example embodiments, and that other locations for beacons 1114a, 1114b are contemplated and can be configured according to the principles described herein.

In some embodiments, mobile device application 124a may determine that mobile device 100 is located within vehicle 300. For example, mobile device application 124a may use one or more of the following data sources alone or in combination: a) received signals from anti-distraction controller 1112, b) received signals from beacons 1114a, 1114b, c) one or more global positioning system (GPS) readings, d) received signals from in-vehicle Bluetooth devices such as audio systems, and e) third party APIs available on mobile devices configured to determine when a mobile device 100 is "in vehicle". These third-party APIs, such as the Google Activity Recognition API and the Apple Core Motion Framework, allow mobile applications to receive status updates indicating the mobile device has entered a vehicle. As these third-party APIs are often proprietary and closed-source, how they internally function might not be visible to mobile device application 124a. In some embodiments, mobile device application 124a may combine these data sources using an algorithm such as a Kalman filter, to better detect when mobile device 100 is within or not within the vehicle 300.

In some embodiments, mobile device application 124a may immediately restrict device functionality upon determining that mobile device 100 is located within vehicle 300. In that sense, the default condition for a mobile device 100 determined to be within vehicle 300 may be to have one or more functions disabled. As such, in the event of a failure or error within the system, mobile device 100 would return to the default state in which functions are inhibited. This may enhance the safety of the passengers and drivers alike within vehicle 300. This may be useful and enhance safety in various scenarios. For example, in the event that a beacon becomes damaged or is removed, mobile device 100 would still have functions disabled upon determining that the mobile device 100 is within vehicle 300.

In an alternative embodiment, mobile device application 124a may be configured to allow mobile device 100 functionality by default. This may be useful in specific scenarios for practical reasons. For example, on a bus, placing a beacon near the bus driver, and having driving mode application 124a configured to allow mobile device functionality unless a beacon signal is detected, would allow for the passengers on the bus to enjoy full use of their mobile devices, rather than placing beacons at various locations throughout the bus in order to provide enabling signals to the mobile phones of the passengers.

Although FIGS. 13A and 13B depict an embodiment having two transceivers 1114a, 1114b, other embodiments may involve the use of more than two transceivers, and other embodiments may involve the use of less than two transceivers (e.g. a single transceiver embodiment). Distance may be estimated, for example, by driving mode application 124a being aware of the initial transmit power of beacon signals, and the knowledge that signal strength of electromagnetic signals attenuates over a distance. Distance may also be estimated by recording observed signal characteristics at known distances, and using these recorded signal characteristics to create a model for estimating distance when provided with observed signal characteristics.

In some embodiments, anti-distraction controller 1110 may include a transceiver configured to broadcast a signal (sometimes referred to herein as a beacon signal). In some embodiments, the signal broadcast by the anti-distraction controller 1110 may include vehicle data. In some embodiments, vehicle data may include one or more of signals from engine controller 202, transmission controller 204, accessories 206, and sensors 208 indicative of the state of vehicle 300, including whether vehicle 300 is in motion. In some embodiments, vehicle data may include vehicle status data, including one or more of vehicle gear, vehicle speed, seat occupancy, and the like.

Figure 14:
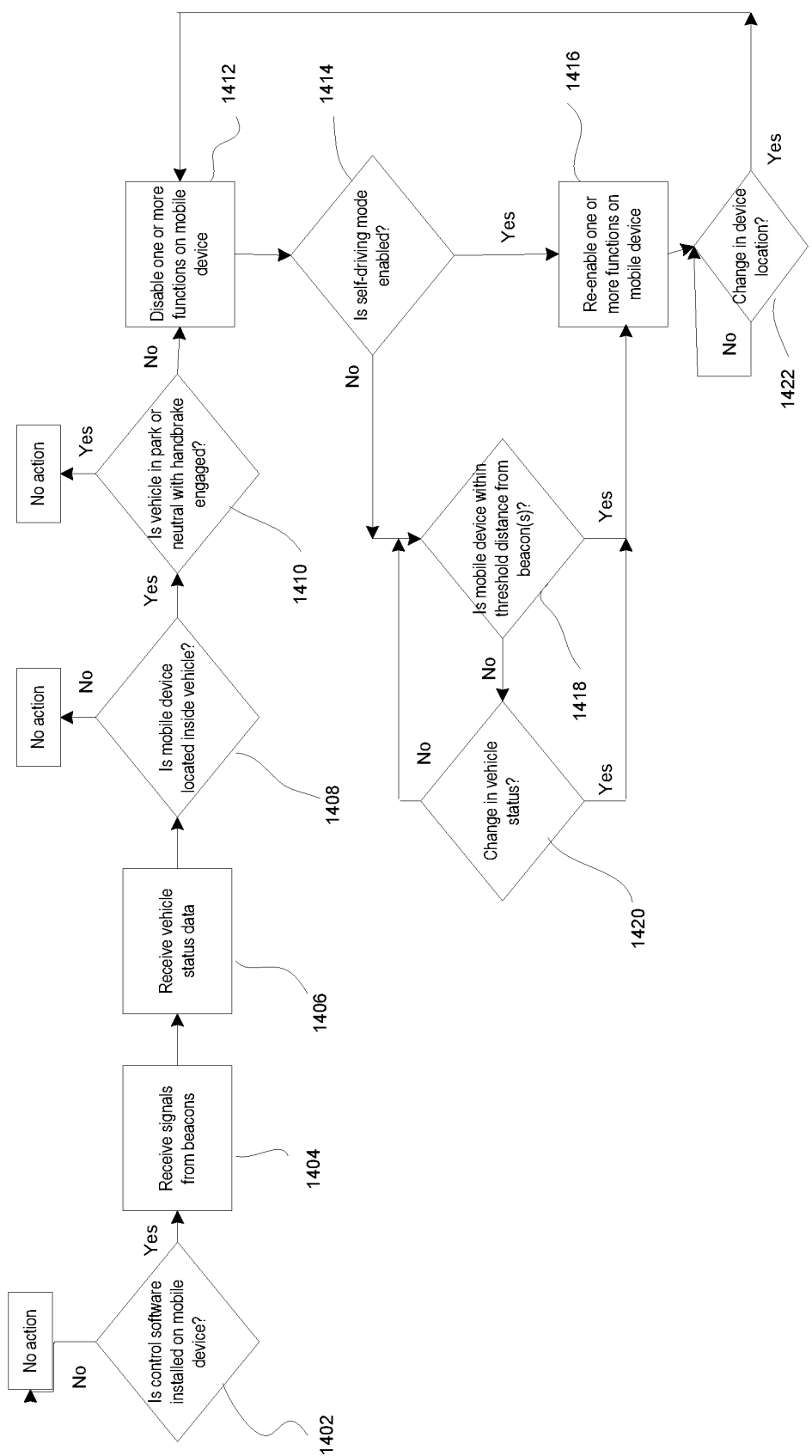
FIG. 14 is a flow diagram depicting an example control process for a mobile device.

FIG. 14 is a flow diagram depicting an example process for controlling a mobile device 100. A separate flow diagram depicting an example process for configuring mobile device 100 is described with reference to FIG. 15. At block 1402, it is determined whether the mobile device 100 has the necessary control software (e.g. driving mode application 124a) installed. If the control software is not installed, no action is taken. Contrastingly with embodiments described above in which the anti-distraction controller 212 sends a disabling signal to the mobile device 100, in process 1400, software applications executing on the mobile device 100 control whether one or more functions will be disabled on mobile device 100.

If the control software is installed on mobile device 100, then the mobile device receives signals from beacons at block 1404. In some embodiments, mobile device 100 receives beacon signals from both beacons 1114a, 1114b. In some embodiments, mobile device 100 receives signals from one of beacons 1114a, 1114b. In some embodiments, vehicle 300 includes only one beacon 1114, and mobile device 100 receives signals from the lone beacon 1114. In some embodiments, mobile device 100 is configured to determine the signal strength of the received beacon signal(s).

At 1406, mobile device application 124a receives vehicle status data using signals received by the mobile device 100. In some embodiments, vehicle status data is broadcast from anti-distraction controller 1112. In some embodiments, anti-distraction controller 1112 is configured to transmit vehicle status data to beacons 1114a, 1114b, and the signals emitted from beacons 1114a, 1114b may contain vehicle status data. Thus, in some embodiments, blocks 1404 and 1406 may both be performed when the mobile device 100 receives the signals emitted from beacons 1114a, 1114b or from anti-distraction controller 1112. In some embodiments, driving mode application 124a may receive signals, such as GPS signals, from mobile device 100 and may use the received GPS signals (either in combination with other received signals, or without combining the received GPS signals with other data) to estimate vehicle status. Vehicle status data may include one or more of the current vehicle gear, current vehicle speed, seat occupancy (e.g. by weight-sensitive sensors in each seat cushion), current vehicle position based on vehicle GPS or navigation system, and the like.

At block 1408, driving mode application 124a determines whether mobile device 100 is located within vehicle 300. Mobile device 100 may make an estimate of the current operational context based on any number of data sources. For example, as described above, driving mode application 124a may use one or more of the following data sources alone or in combination: a) received signals from anti-distraction controller 1112, b) received signals from beacons 1114a, 1114b, c) one or more global positioning system (GPS) readings, d) received signals from in-vehicle Bluetooth devices such as audio systems, and e) third party APIs available on mobile devices configured to determine when a mobile device 100 is "in vehicle".

In some embodiments, beacons 1114 may broadcast an identifier comprising at least two parts, including an identifier denoting the protocol being used, and a unique identifier for the specific beacon 1114a. In some embodiments, mobile devices 100 having driving mode application 124a installed thereon may store or have access to a register of beacons and data associated therewith for individual vehicles 300. Upon approaching a vehicle 300, mobile device 100 having driving mode application 124a installed thereon may receive beacon signals and in turn determine which vehicle 300 is broadcasting the signals, and rely on data associated with said particular vehicle 300 to determine whether the mobile device 100 is located within or outside of said vehicle 300 (e.g. using an established machine learning model for the particular vehicle 300).

In some embodiments, mobile device 100 may contain a GPS receiver and may be configured to determine the current location of mobile device 100. Further, anti-distraction controller 1112 may include the current position of vehicle 300 in the vehicle status data which is broadcast and received by mobile device 100. Mobile device 100 may determine that mobile device 100 is located inside vehicle 300 if, for example, the current location of mobile device 100 as determined by multiple consecutive GPS readings on mobile device 100 is within a threshold distance of the current location of vehicle 300 as based on received vehicle status data. In some embodiments, it may be more accurate to rely on two or more consecutive GPS readings, so as to determine whether the vehicle 300 and mobile device 100 are moving at roughly the same speed. In some embodiments, even if the GPS location estimated by the mobile device 100 does not strictly match the GPS location provided by anti-distraction controller 1112 (this may occur due to lack of precision or differences in GPS equipment in vehicle 300 and mobile device 100), it may be reasonable to assume that mobile device 100 is located within vehicle 300 if the rate of change of position (e.g. the velocity) of the vehicle 300 and mobile device 100 are approximately equal.

In some embodiments, mobile device 100 may have installed thereon third-party application programming interfaces (APIs) configured to accurately determine when mobile device 100 is within vehicle 300. These third-party APIs, such as the Google Activity Recognition API and the Apple Core Motion Framework, allow mobile applications to determine if the mobile device is inside a vehicle. As these third-party APIs are often proprietary and closed-source, how they internally function may not be visible to mobile device application 124a. In some embodiments, mobile device application 124a may combine these data sources using an algorithm such as a Kalman filter, to better detect when mobile device 100 is within or not within the vehicle 300.

At 1408, if driving mode application 124a determines that mobile device 100 is not located within vehicle 300, then no action is taken. If mobile device 100 determines that it is located within vehicle 300, then the method proceeds to block 1410, where it is determined whether vehicle 300 is either in the Park gear or in the Neutral gear with the handbrake engaged. It will be appreciated by those skilled in the art that an automatic transmission vehicle engaged in the Park gear is unlikely to be in motion, irrespective of whether the handbrake is engaged. It will be further appreciated that a vehicle with a manual transmission (or automatic transmission) in neutral with the handbrake engaged is also unlikely to be in motion. As such, at block 1410, if it is determined that the vehicle is in Park, or in Neutral with the handbrake engaged, no action is taken by mobile device 100. However, in some embodiments, driving mode application 124a may disable one or more functions of mobile device 100 upon determining that mobile device 100 is located within vehicle 300, prior to determining whether vehicle 300 is in park or in neutral with the handbrake engaged.

If the vehicle is not in Park and the handbrake is not engaged, then at block 1412 driving mode application 124a disables or inhibits one or more functions of mobile device 100. The disabled functions may include, for example, the same functions as are inhibited by driving mode application 124a in previously described embodiments. Such functions may include sending or receiving of data or text transmissions, sending or receiving of cellular calls unless such calls are routed through a hands-free device such as a Bluetooth headset or radio system within vehicle 300. Cellular radio 112 may be disabled entirely. Actions such as launching of specific applications, such as web browsers, media players, social media applications, email, and messaging applications may also be inhibited.

In some embodiments, certain input modes may be inhibited. For example, keyboard or touchscreen inputs, or one or more buttons on mobile device 100 may be inhibited. Driving mode application 124a may also convert inhibited or disabled functions into non-distracting alternative forms. For example, text-based messages such as SMS or email messages may be read aloud using a text-to-voice engine. Further, voice inputs may be processed using a voice-to-text engine.

After disabling one or more functions at block 1412, the method proceeds to block 1414, where it is determined whether a self-driving mode is enabled. This may be determined, for example, via the vehicle status data sent by anti-distraction controller 1112. The self-driving mode driving status data may be determined based on self-driving subsystem 220 and delivered to anti-distraction subsystem 1110.

At block 1414, if driving mode application 124a determines that self-driving mode is enabled in vehicle 300, one or more functions of mobile device 100 may be re-enabled at block 1416. If self-driving mode is not enabled, the method proceeds to block 1418, where it is determined whether the mobile device is located within a threshold distance from one or more of beacons 1114a, 1114b and/or anti-distraction controller 1112. This determination might not require input from more than one received signal at mobile device 100.

For example, if beacon 1114a is located within a passenger side door, and the received signal strength indicates that mobile device 100 is located 5 cm away from beacon 1114a, this information is sufficient to determine that the mobile device 100 is not in the driver's seat of vehicle 300 and is likely not being used by the driver of the vehicle. Likewise, if beacon 1114b is located behind the rear seat, and the received signal strength indicates that the mobile device 100 is located 10 cm from beacon 1114b, this is sufficient information to determine that the phone is close to the back seat and is unlikely to be being used by the driver. In such cases, one or more functions of mobile device 100 are re-enabled at block 1416.

However, certain situations may cause the driving mode application 124a on mobile device 100 to default to inhibit functions on mobile device 100 regardless of the received beacon signals and vehicle status data. For example, vehicle 300 may include sensors 208 under seats which detect the presence of drivers or passengers. If vehicle status data includes sensor data indicating that there is only one occupant in the vehicle and that occupant is located in the driver's seat of the vehicle, then the mobile device 100 may inhibit one or more functions of said mobile device regardless of the location within the vehicle of mobile device 100. However, in some embodiments, if a self-driving mode is enabled for vehicle 300, the driving mode application on mobile device 100 may re-enable the one or more inhibited functions.

In some embodiments, a threshold distance may be defined for each of one or more beacons 1114a, 1114b and anti-distraction controller 1112. If mobile device 100 determines that it is not within a threshold distance of beacons 1114a or 1114b, then the method will proceed to block 1420, where vehicle status is monitored for any relevant change (e.g. a change in gear from Drive to Park). In some embodiments, a change in vehicle status data may cause driving mode application 124a to re-enable one or more inhibited functions on mobile device 100 at block 1416.

It should be noted that after block 1416 has been performed, the system may continuously monitor both vehicle status data, as well as the location of mobile device 100 within vehicle 300. For example, if a change in the location of mobile device 100 is detected at block 1422, in some embodiments, mobile device 100 will revert to a default state of disabling or inhibiting one or more functions at block 1412.

It should be noted that in some embodiments, the default condition for a mobile device 100 determined to be within vehicle 300 is to have one or more functions disabled. As such, in the event of a failure or error within the system, mobile device 100 would return to the default state in which functions are inhibited. This may enhance the safety of the passengers and drivers alike within vehicle 300.

Figure 15:
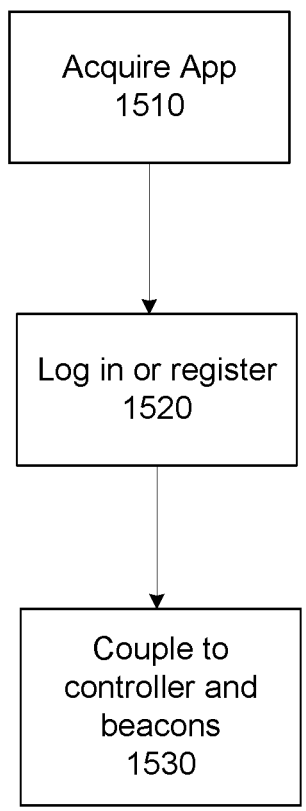
FIG. 15 is a flow chart depicting an example method of configuring a mobile device to use anti-distracted driving subsystem of FIG. 12.

FIG. 15 is a flow diagram describing an example process for configuring a mobile device to use anti-distracted driving subsystem 1100. At 1510, the user acquires a software application (e.g. driving mode application 124a) from, for example, the Google Play Store or the Apple App Store. The user may also obtain the application source code through other channels and install the app directly (e.g. using an APK file for an Android device). If the software application is already installed, the user need not carry out block 1510.

At 1520, the user logs into their account or registers a new account. At 1530, the app 124a couples with a controller 1112 and/or a set of beacons 1114. For example, the app on mobile device 100 may scan for nearby controllers 1112 and/or beacons 1114 and then display detected controllers 1112 on, for example, a user interface displayed on touchscreen of mobile device 100. In some embodiments, the vehicle configuration data (e.g. one or more of Vehicle Identification Number, make, model, year) may be obtained from vehicle 300 and displayed for a particular controller 1112 (this information may be obtained via the OBD port of vehicle 300 to which controller 1112 is connected). The user may then select the controller and beacon set which match their vehicle 300.

In some embodiments, a QR code may be provided within vehicle 300 which acts as a shortcut for users to register a vehicle. For example, mobile device 100, via the application, may be configured to scan a QR code for a previously registered controller 1112 and beacon 1114 set. In some embodiments, the QR code may be affixed to a convenient location within vehicle 300 for scanning by mobile device 100.

In some embodiments, if a user has already registered a particular set of controller 1112 and beacons 1114, driving mode app 124a may be configured to automatically default to coupling to the previously registered set.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be at least partly in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Although the embodiments have been described in detail, it should be understood that various changes, substitutions and alterations can be made herein without departing from the scope as defined by the appended claims.

What is claimed is:

1. An anti-distracted driving system, comprising:
   one or more beacons at different locations within a vehicle, each of said beacons including a transceiver operable to broadcast a beacon signal wirelessly; and
   a mobile device comprising a processor and a memory storing computer-executable instructions that, when executed by said processor, cause said mobile device to perform a method comprising:
   receive one or more beacon signals from said one or more beacons;
   determining, by said mobile device, that said mobile device is within said vehicle;
   responsive to determining that said mobile device is within said vehicle, and without regard to information contained in said one or more beacon signals, disabling one or more functions of said mobile device;
   determine, by said mobile device, whether to re-enable at least one of said one or more functions of said mobile device; and
   responsive to determining that at least one of said one or more functions of said mobile device should be re-enabled, re-enabling at least one of said one or more functions of said mobile device.

2. The anti-distracted driving system of claim 1, wherein determining whether to re-enable the at least one of said one or more functions comprises: determining a location of said mobile device based at least in part on said received beacon signals; determining whether said mobile device is within a threshold distance of one or more of said beacons; and responsive to determining that said mobile device is within the threshold distance, re-enabling the at least one of said one or more functions of said mobile device.

3. The anti-distracted driving system of claim 1, further comprising receiving vehicle status data, and wherein determining whether to re-enable the at least one of said one or more functions comprises: determining, based on said received vehicle status data, that said vehicle is travelling below a threshold speed or is in a particular gear, and, responsive to determining that said vehicle is travelling below said threshold speed or is in said particular gear, re-enabling the at least one of said one or more functions of said mobile device.

4. The anti-distracted driving system of claim 1, further comprising receiving vehicle status data, and wherein determining whether to re-enable the at least one of said one or more functions comprises: determining, based on said received vehicle status data, that said vehicle is in a self-driving mode and, responsive to determining that said vehicle is in said self-driving mode, re-enabling the at least one of said one or more functions of said mobile device.

5. The anti-distracted driving system of claim 1, wherein said transceivers are Bluetooth transceivers.

6. The anti-distracted driving system of claim 1, wherein said beacon signals are emitted every 100 milliseconds.

7. The anti-distracted driving system of claim 3, wherein said beacon signals include said vehicle status data.

8. The anti-distracted driving system of claim 3, wherein said vehicle status data is transmitted from an anti-distracted driving controller in said vehicle.

9. The anti-distracted driving system of claim 3, wherein said vehicle status data includes at least one of:
- a current gear of said vehicle;
- a current speed of said vehicle;
- a current engine speed of said vehicle;
- a current location of said vehicle;
- an occupancy status of one or more seats of said vehicle; and
- a self-driving mode status of said vehicle.

10. The anti-distracted driving system of claim 2, wherein determining said location of said mobile device comprises determining a distance of said mobile device from each of said beacons based on a signal strength of said received beacon signals.

11. The anti-distracted driving system of claim 1, wherein said at least one function of said mobile device includes one or more of:
- a media function of said mobile device;
- a text input function of said mobile device; and
- a short-message service (SMS) function of said mobile device.

12. The anti-distracted driving system of claim 10, wherein said location of said mobile device is determined based on a signal strength of said received beacon signals and a model based on previously observed received beacon signal strengths.

13. The anti-distracted driving system of claim 1, wherein said one or more beacons comprise a single beacon.

14. The anti-distracted driving system of claim 1, wherein one of said one or more beacons is located proximal to a passenger side door of said vehicle.

15. The anti-distracted driving system of claim 1, wherein one of said one or more beacons is located proximal to a back seat of said vehicle.

16. The anti-distracted driving system of claim 1, wherein determining that said mobile device is within said vehicle is based on at least one of:
- a received signal from an anti-distracted driving controller;
- one or more received beacon signals;
- one or more global positioning system (GPS) readings; and/or
- received signals from in-vehicle devices other than the one or more beacons.

17. The anti-distracted driving system of claim 1, wherein said mobile device is configured to identify said vehicle based on said received beacon signals.

18. A method comprising:
- receiving, at a mobile device, one or more beacon signals from one or more beacons located at different locations within a vehicle;
- determining, by said mobile device, that said mobile device is within said vehicle;
- responsive to determining that said mobile device is within said vehicle, and without regard to information contained in said one or more beacon signals, disabling one or more functions of said mobile device;
- determining, by said mobile device, whether to re-enable at least one of said one or more functions of said mobile device; and
- responsive to determining that at least one of said one or more functions of said mobile device should be re-enabled, re-enabling at least one of said one or more functions of said mobile device.

* * * * *